US012775276B1

(12) United States Patent
Salter et al.

(10) Patent No.: US 12,775,276 B1
(45) Date of Patent: Oct. 27, 2026

(54) SYSTEMS AND METHODS FOR ENABLING VEHICLE MOVEMENT VIA A REMOVABLE VEHICLE WORK SURFACE

(71) Applicant: Ford Global Technologies, LLC, Dearborn, MI (US)

(72) Inventors: Stuart C. Salter, White Lake, MI (US); Jeff Robert Seaman, Petersburg, MI (US); Jenna Rogers, Canton, MI (US); Julie Koltys, Canton, MI (US); Sidhaant Rath, Ann Arbor, MI (US); John Robert Van Wiemeersch, Novi, MI (US)

( * ) Notice: Subject to any disclaimer, the term of this patent is extended or adjusted under 35 U.S.C. 154(b) by 0 days.

(21) Appl. No.: 19/210,519

(22) Filed: May 16, 2025

(51) Int. Cl.
*G05D 1/226* (2024.01)
*B60W 30/06* (2006.01)
(Continued)

(52) U.S. Cl.
CPC ............ *G05D 1/226* (2024.01); *B60W 30/06* (2013.01); *B60W 30/182* (2013.01);
(Continued)

(58) Field of Classification Search
CPC ...... G05D 1/226; G05D 1/2243; G05D 1/622; G05D 1/223; G05D 2111/17; G05D 2111/34; G05D 2109/10; H04W 4/80; H04W 4/40; H04W 4/025; B60W 30/06; B60W 30/182; B60W 50/082; B60W 2556/45; B60W 2420/408; B60W 2420/403
See application file for complete search history.

(56) References Cited

U.S. PATENT DOCUMENTS 10,166,995 B2 1/2019 Beauvais
2020/0047687 A1 2/2020 Camhi et al.
(Continued)

FOREIGN PATENT DOCUMENTS

KR 20240151678 A 10/2024

OTHER PUBLICATIONS

NSC, Obstacle Detection, https://mycardoeswhat.org/safety-features/obstacle-detection/#:~:text=An, 2025, pp. 1-9.
(Continued)

*Primary Examiner* — Ramsey Refai
(74) *Attorney, Agent, or Firm* — Frank Lollo; Eversheds Sutherland (US) LLP

(57) ABSTRACT

A vehicle including a removable work surface and a processor is disclosed. The removable work surface may include a wireless tag that may emit signals at a predefined frequency. The processor may obtain a user request to activate a predefined vehicle mode. Responsive to obtaining the user request, the processor may determine that the removable work surface is within a predefined distance range of the vehicle based on the signals obtained from the wireless tag. The processor may activate the predefined vehicle mode responsive to determining that the removable work surface is within the predefined distance range. The processor may then obtain a user input to cause vehicle movement responsive to activating the predefined vehicle mode. The processor may further cause the vehicle movement based on the user input.

20 Claims, 7 Drawing Sheets

(51) Int. Cl.

| | |
|---|---|
| ***B60W 30/182*** | (2020.01) |
| ***B60W 50/08*** | (2020.01) |
| ***G05D 1/223*** | (2024.01) |
| ***G05D 1/224*** | (2024.01) |
| ***G05D 1/622*** | (2024.01) |
| ***H04W 4/02*** | (2018.01) |
| ***H04W 4/40*** | (2018.01) |
| ***H04W 4/80*** | (2018.01) |
| *G05D 109/10* | (2024.01) |
| *G05D 111/10* | (2024.01) |
| *G05D 111/30* | (2024.01) |

(52) U.S. Cl.

CPC ........... *B60W 50/082* (2013.01); *G05D 1/223* (2024.01); *G05D 1/2243* (2024.01); *G05D 1/622* (2024.01); *H04W 4/025* (2013.01); *H04W 4/40* (2018.02); *H04W 4/80* (2018.02); *B60W 2420/403* (2013.01); *B60W 2420/408* (2024.01); *B60W 2556/45* (2020.02); *G05D 2109/10* (2024.01); *G05D 2111/17* (2024.01); *G05D 2111/34* (2024.01)

(56) References Cited

U.S. PATENT DOCUMENTS

| | | | | |
|---|---|---|---|---|
| 2020/0267253 | A1* | 8/2020 | Grunfeld ............ | G06K 7/10297 |
| 2020/0294401 | A1 | 9/2020 | Kerecsen | |
| 2021/0291832 | A1 | 9/2021 | Simmons et al. | |
| 2023/0024151 | A1* | 1/2023 | Kim ................... | G01C 21/3438 |
| 2023/0087202 | A1* | 3/2023 | Lavoie ............... | B62D 15/0285 701/2 |
| 2024/0142990 | A1 | 5/2024 | Faust et al. | |
| 2024/0192694 | A1* | 6/2024 | Albrecht ............ | B62D 15/0285 |
| 2024/0345588 | A1* | 10/2024 | Niiuchi ..................... | B60R 1/22 |
| 2025/0076882 | A1* | 3/2025 | Puetz ..................... | G05D 1/223 |
| 2025/0291367 | A1* | 9/2025 | Park ..................... | G05D 1/2247 |
| 2025/0355436 | A1* | 11/2025 | Deleplanque ....... | B60C 23/0488 |

OTHER PUBLICATIONS

MeBeSafe, A Nudge in the Car to Increase Attention, https://www.mebesafe.eu/a-nudge-in-the-car-to-increase-attention/, 2025, pp. 1-3.

* cited by examiner

SYSTEMS AND METHODS FOR ENABLING VEHICLE MOVEMENT VIA A REMOVABLE VEHICLE WORK SURFACE

FIELD

The present disclosure relates to vehicles and more specifically to systems and methods for enabling vehicle movement via a removable clipboard that is part of the vehicle's console lid.

BACKGROUND

Users may move their vehicles over relatively short distances frequently when the users may be performing outdoor activities or tasks. For example, a user may frequently move the user's vehicle over short distances (e.g., 5-10 meters) when the user may be gardening, laying fences, etc.

It may be inconvenient for the user to frequently enter and move the vehicle and then exit the vehicle multiple times to perform the activity, and hence the user may not prefer to enter the vehicle frequently when the user may be performing such activities. Therefore, it may be desirable to have a system that may enable the user to conveniently move the vehicle over relatively short distances without repeatedly entering and exiting the vehicle.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
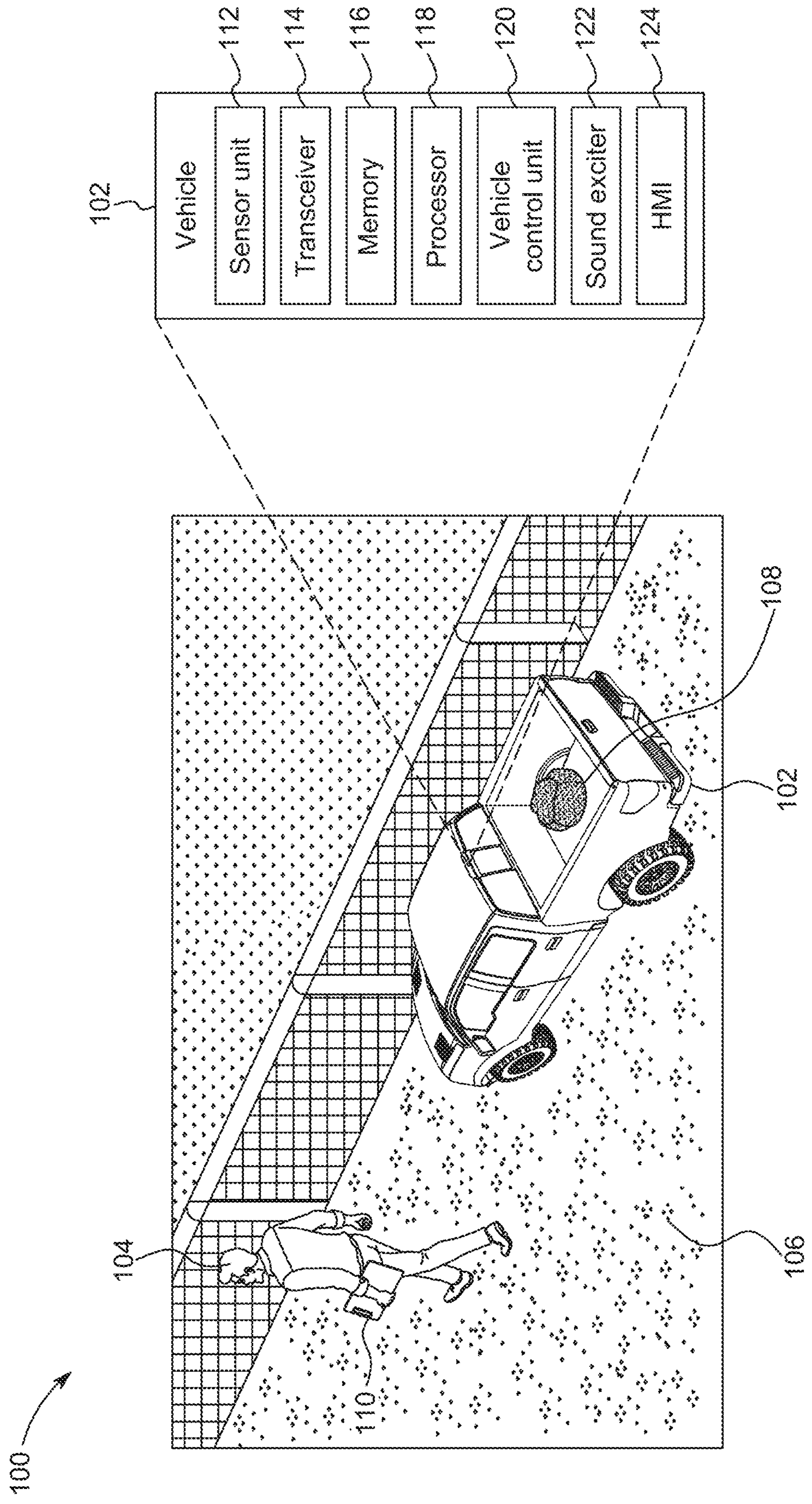
FIG. 1 depicts an environment in which techniques and structures for providing the systems and methods disclosed herein may be implemented.

The present disclosure describes a vehicle that may enable a vehicle operator/user to cause and control the vehicle movement when the user may be outside the vehicle, by using one or more existing vehicle components. Stated another way, the user may not require to use any user device (e.g., mobile phone, tablet, etc.) or any external controller/joystick to cause and control the vehicle movement when the user is outside the vehicle and may instead use existing vehicle component(s) to move the vehicle. In an exemplary aspect, such a vehicle component may be a clipboard or a removable work surface that may be part of a console lid of a vehicle's center console. The concept of the console lid with removable work surface/clipboard is described in the U.S. patent application Ser. No. 19/169,050, filed on Apr. 3, 2025, which is incorporated by reference in its entirety in the present disclosure.

In an exemplary aspect, the clipboard or the removable work surface may include a wireless tag that may emit signals at a predefined frequency. As an example, the wireless tag may be a Bluetooth Low Energy (BLE) tag that may emit signals in 2.4 GHz frequency band. As another example, the wireless tag may be an Ultra-Wideband (UWB) tag that may emit signals in a frequency range of 3.1 to 10.6 GHz. The removable work surface may enable the user to cause and control the vehicle movement when the user is outside the vehicle, as long as the removable work surface is within a predefined distance range (e.g., 15 feet) of the vehicle, as briefly described below.

In some aspects, when the user desires to cause and control the vehicle movement via the removable work surface/clipboard, the user may first transmit a request ("user request") to the vehicle to activate a predefined vehicle mode (e.g., a remote vehicle control mode). Responsive to receiving the user request (e.g., via a voice command or vehicle HMI), the vehicle may first determine whether the removable work surface is within the predefined distance range of the vehicle based on the signals obtained from the wireless tag. In an exemplary aspect, the vehicle may determine whether the removable work surface is within the predefined distance range of the vehicle by measuring the Received Signal Strength Indicator (RSSI) value of the signals received by the vehicle's transceiver(s) from the wireless tag. If the measured RSSI value is relatively high, it may indicate that the removable work surface is close or within the predefined distance range of the vehicle.

The vehicle may activate the remote vehicle control mode responsive to determining that the removable work surface is within the predefined distance range of the vehicle. The vehicle may further receive a user input via a voice command to cause the vehicle movement responsive to activating the remote vehicle control mode and then cause the vehicle movement based on the user's voice command. In an exemplary aspect, there may be many ways in which the user can cause and control the vehicle movement via the removable work surface. For example, in one aspect, the user may make the vehicle follow the user (specifically the removable work surface) when the user may be carrying the removable work surface in the user's hand. As another example, the user may make the vehicle back up or reverse and park up to the removable work surface. In this case, the user may put or keep the removable work surface where the user desires the vehicle to back up and then output a voice command "Back up to the clipboard" or "Back up within 2 feet of the clipboard", to cause the desired vehicle movement.

In an exemplary aspect, before causing the vehicle movement as described above, the vehicle may seek a confirmation from the user on whether the user actually desires to move the vehicle according to the voice command. The vehicle may cause the vehicle movement only after receiving the user's confirmation in this case. In this manner, the vehicle adds an additional layer of security by seeking the user's confirmation before causing the vehicle to move.

As another layer of security, before causing the vehicle movement and/or while the vehicle is moving, the vehicle may continuously obtain inputs from the vehicle's sensor unit (e.g., RGB images, radar images, etc.) to determine if any obstacle is present on the path of the vehicle movement. Responsive to determining an obstacle presence on the vehicle movement's path, the vehicle may stop or disable the vehicle movement, thereby preventing any adverse scenario.

As yet another layer of security, the vehicle may check whether a new user input is received by the vehicle within a predefined time duration (e.g., 1 minute) of obtaining a previous user input. The vehicle may deactivate the remote vehicle control mode (and hence may not accept any new user input until the remote vehicle control mode is reactivated by the user) responsive to determining that no new user input is received by the vehicle within the predefined time duration of obtaining the previous user input.

The present disclosure discloses a vehicle that may enable a user to cause and control the vehicle movement when the user may be outside the vehicle, by using one or more existing vehicle components. The vehicle further provides multiple layers of security while causing the vehicle movement to prevent any adverse situation. Additionally, the vehicle enables the user to cause and control the vehicle movement via voice commands, thereby considerably enhancing the user's convenience, especially when the user is performing an outdoor activity such as gardening, laying fences, etc.

These and other advantages of the present disclosure are provided in detail herein.

Illustrative Embodiments

The disclosure will be described more fully hereinafter with reference to the accompanying drawings, in which example embodiments of the disclosure are shown, and not intended to be limiting.

FIG. 1 depicts an environment 100 in which techniques and structures for providing the systems and methods disclosed herein may be implemented. FIG. 1 will be described in conjunction with FIGS. 2-6.

The environment 100 may include a vehicle 102 and a user 104. The user 104 may be performing an outdoor activity on a farm 106 (or any other location) where the vehicle 102 may be located. For example, the user 104 may be sowing plants on a farm periphery or laying fences. The user 104 may be using vehicle cargo bed to store material 108 that may be required to perform the outdoor activity, e.g., sand, plants, equipment/tools, manure, and/or the like. In some aspects, the user 104 may be required to move the vehicle 102 frequently over short distances (e.g., 5-10 meters) as the user 104 performs the outdoor activity around the farm periphery.

The vehicle 102 may take the form of any passenger or commercial vehicle such as a car, a work vehicle, a crossover vehicle, a van, a minivan, etc. Further, the vehicle 102 may be a manually driven vehicle and/or may be configured to operate in a fully autonomous (e.g., driverless) mode or a partially autonomous mode and may include any powertrain such as a gasoline engine, one or more electrically-actuated motor(s), a hybrid system, etc.

In some aspects, the vehicle 102 may enable the user 104 to cause and control the vehicle movement when the user 104 is outside the vehicle 102 (as shown in FIG. 1), by using one or more existing vehicle components. Stated another way, the user 104 may not require to use any user device (e.g., mobile phone, tablet, etc.) or any external controller/joystick to cause and control the vehicle movement when the user 104 is outside the vehicle 102 and may instead use existing vehicle component(s) to move the vehicle 102 over short distances. In an exemplary aspect, such a vehicle component may be a clipboard 110 or a removable work surface 402 that may be part of a console lid 210 of a vehicle's center console 202. The console lid 210 (having the removable work surface 402 and the clipboard 110) is depicted in FIGS. 2-5 and briefly described below. The concept of the console lid 210, as briefly disclosed in the present disclosure, is described in detail in the U.S. patent application Ser. No. 19/169,050, filed on Apr. 3, 2025, which is incorporated by reference in its entirety in the present disclosure.

Figure 2:
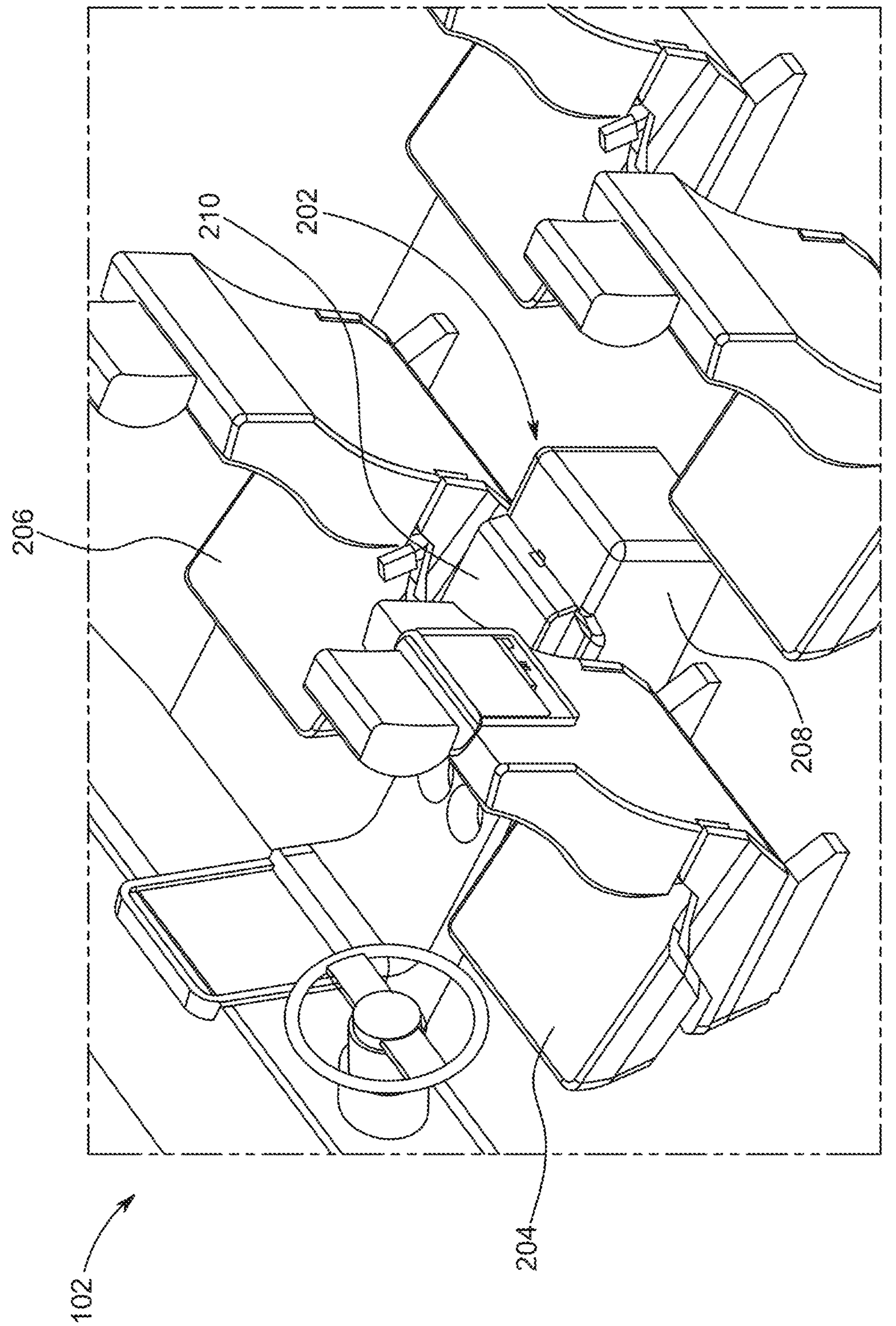
FIG. 2 depicts an interior view of a vehicle in accordance with the present disclosure.

An interior view of the vehicle 102 is depicted in FIG. 2. In an exemplary aspect, the vehicle 102 may include a driver sitting area 204 and a front passenger sitting area 206. The space between the driver sitting area 204 and the front passenger sitting area 206 may include the center console 202. The center console 202 may include a housing 208 that may have sidewalls that define a storage compartment 302 (shown in FIGS. 3 and 5). The center console 202 may further include a movable console lid 210 that may move by pivoting between a closed position covering the storage compartment 302 and an open position allowing access to the storage compartment 302 from the top side. The console lid 210 may also serve as an armrest for supporting an arm of an occupant on the lid's top surface when the console lid 210 is in the closed position. The console lid 210 may include the removable work surface 402 (shown in FIGS. 4 and 5) that may be removed and reinstalled on the console lid 210. Stated another way, the removable work surface 402 may be removably disposed on the console lid 210.

Figure 3:
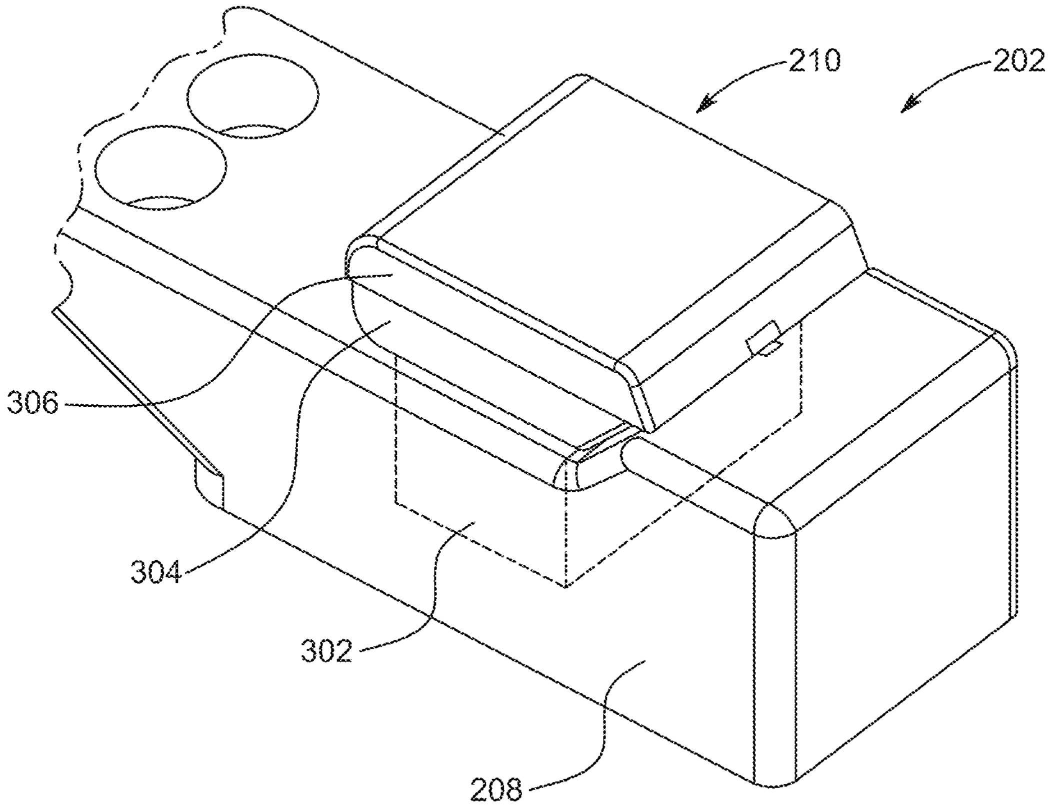
FIG. 3 depicts a view of a vehicle's center console with a console lid in a closed position, in accordance with the present disclosure.
Figure 4:
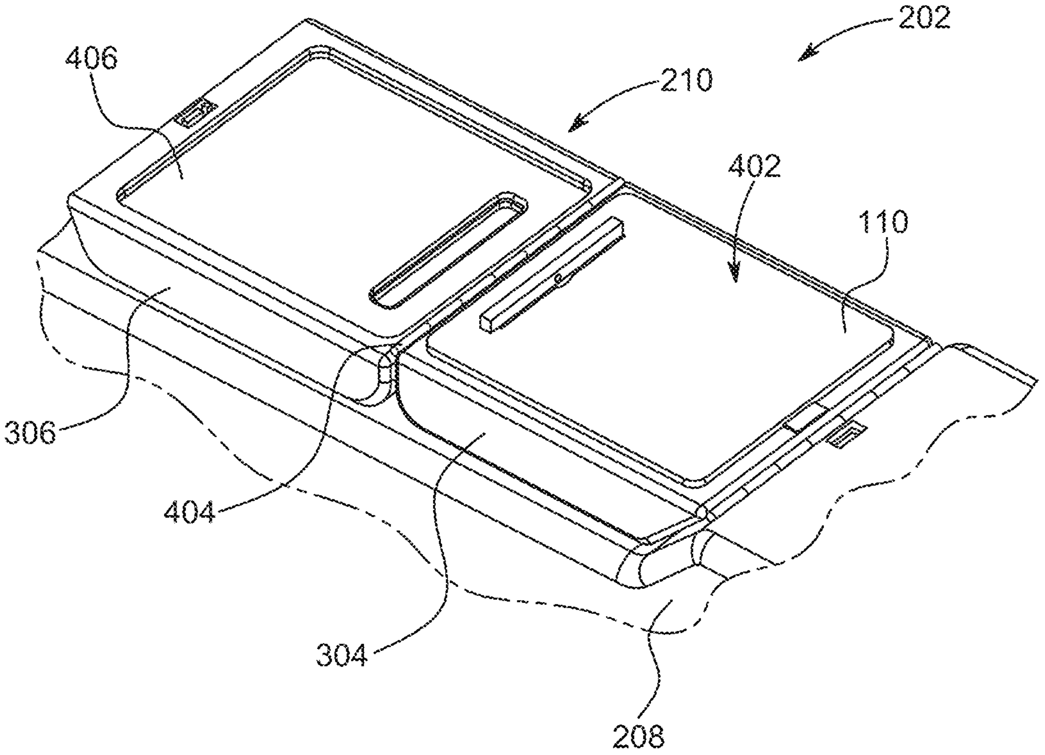
FIG. 4 depicts a view of the console lid of FIG. 3 in an open position, in accordance with the present disclosure.

In some aspects, the console lid 210 may be a two-piece lid assembly that includes a lower lid portion 304 hinged (or rotatably connected) to an upper lid portion 306 via a hinge 404. The console lid 210 is shown in FIG. 3 in a folded configuration (or a closed position) covering the access to the underlying storage compartment 302. The console lid 210 in the open position is shown in FIGS. 4 and 5.

When the console lid 210 is in the open position, an interior surface of the upper lid portion 306 may provide an extended work surface 406 to the vehicle's front occupants (e.g., the driver or the front passenger). The extended work surface 406 may provide space for the vehicle's front occupant(s) to work or place one or more objects (e.g., a laptop).

Figure 5:
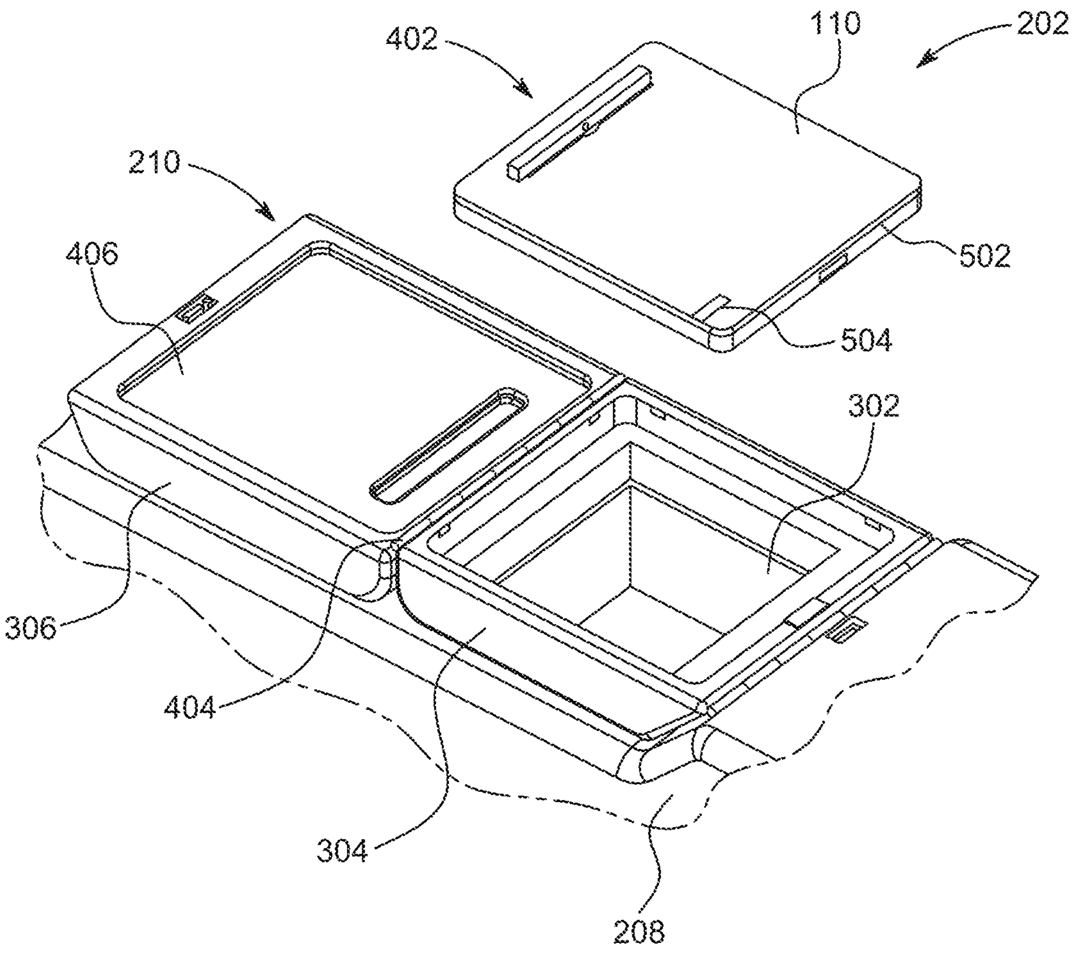
FIG. 5 depicts a view of a removable work assembly removed from the console lid, in accordance with the present disclosure.

The removable work surface 402 may be removed from the lower lid portion 304, as shown in FIG. 5, which also allows access to the storage compartment 302. The removable work surface 402 may be removably installed within the lower lid portion 304 by using a friction fit connection mechanism, a detent-and-slot connection mechanism, and/or the like. In an exemplary aspect, the removable work surface 402 may include the clipboard 110 that may provide clipboard functionality such as a planar work surface and a clipboard retainer. The removable work surface 402 may further include a case or a base 502. The clipboard 110 serves as a cover to the base 502 and is connected to the base 502 via one or more hinge connectors on one sidewall. In an exemplary aspect, a bottom surface (not shown) of the base 502 may be used to store an electronic device (e.g., a tablet, a phone, etc.), a pen or pencil, and/or the like.

A vehicle user (e.g., the user 104) may remove the removable work surface 402 or the clipboard 110 anytime the user 104 desires to access or use these components (or when the user 104 desires to access the storage compartment 302). To remove the removable work surface 402 or the clipboard 110, the user 104 may first move the upper lid portion 306 from the closed position to the open position. The user 104 may then "pull" the removable work surface 402 from the lower lid portion 304 to remove the removable work surface 402 or may use one or more dedicated buttons to release the removable work surface 402 from the lower lid portion 304.

In an exemplary aspect, the removable work surface 402 (specifically the clipboard 110) may further include a wireless tag 504 that may emit signals at a predefined frequency. As an example, the wireless tag 504 may be a Bluetooth Low Energy (BLE) tag that may emit signals in 2.4 GHz frequency band. As another example, the wireless tag 504 may be an Ultra-Wideband (UWB) tag that may emit signals in a frequency range of 3.1 to 10.6 GHz. The examples of the wireless tag 504 described herein should not be construed as limiting the scope of the present disclosure. The wireless tag 504 may be any other type of wireless tag that emits signals and may not necessarily be a BLE tag or a UWB tag, without departing from the present disclosure's scope.

The user 104 may cause and control the vehicle movement via the removable work surface 402, when the user 104 is outside the vehicle 102. Specifically, to cause and control the vehicle movement in such scenarios (e.g., when the user 104 may be performing an outdoor activity, as shown in FIG. 1), the user 104 may first remove the removable work surface 402 from the lower lid portion 304 and then take the removable work surface 402 outside the vehicle 102. The user 104 may then provide voice commands to the vehicle 102 to cause the vehicle movement. Responsive to receiving the user's voice commands, the vehicle 102 may move according to the user's commands as long as the removable work surface 402 stays within a predefined distance range (e.g., 15 feet) of the vehicle 102. The process of causing and controlling the vehicle movement via the removable work surface 402 is described later in the description below.

In some aspects, in addition to the vehicle components described above in conjunction with FIGS. 2-5, the vehicle 102 may additionally include a sensor unit 112, a transceiver 114, a memory 116, a processor 118, a vehicle control unit 120, a sound exciter 122, and a Human-Machine Interface 124 (or HMI 124), as shown in FIG. 1. The sensor unit 112 may include a plurality of sensors including, but not limited to, a Radio Detection and Ranging ("radar") sensor configured for detection and localization of objects inside and outside the vehicle 102 using radio waves, sitting area buckle sensors, sitting area sensors, a Light Detecting and Ranging ("lidar") sensor, door sensors, proximity sensors, temperature sensors, wheel sensors, one or more ambient weather sensors, vehicle interior and exterior cameras, steering wheel sensors, and/or the like. In an exemplary aspect, the sensor unit 112 may capture inputs associated with vehicle's surroundings. For example, the sensor unit 112 may capture images (e.g., RGB images, radar images, etc.) of vehicle's surroundings by using one or more sensors described above.

The vehicle control unit 120 may include a plurality of Electronic Control Units (ECUs) and may control vehicle operational aspects based on command signals obtained from the processor 118. For example, the vehicle control unit 120 may cause the vehicle movement based on the command signals obtained from the processor 118. In some aspects, one or more vehicle components described above may be part of the vehicle control unit 120. For example, in an exemplary aspect, the sensor unit 112 may be part of the vehicle control unit 120.

The sound exciter 122 may include one or more speakers, microphones, etc. and may operate based on the command signals obtained from the processor 118. Further, the HMI 124 may include a touchscreen interface portion and may include voice recognition features, biometric identification capabilities that may identify users based on facial recognition, voice recognition, fingerprint identification, or other biological identification means. In other aspects, the HMI 124 may be further configured to receive user instructions via the touchscreen interface portion and/or output or display notifications, navigation maps, etc. on the touchscreen interface portion.

The transceiver 114 may receive information/inputs/signals from one or more external devices or systems (e.g., the wireless tag 504) via one or more wireless networks. The network(s), as described herein, illustrates an example communication infrastructure in which the connected devices discussed in various embodiments of this disclosure may communicate. The network(s) may be and/or include the Internet, a private network, public network or other configuration that operates using any one or more known communication protocols such as transmission control protocol/Internet protocol (TCP/IP), Bluetooth®, BLE, Wi-Fi based on the Institute of Electrical and Electronics Engineers (IEEE) standard 802.11, ultra-wideband (UWB), and cellular technologies such as Time Division Multiple Access (TDMA), Code Division Multiple Access (CDMA), High-Speed Packet Access (HSPDA), Long-Term Evolution (LTE), Global System for Mobile Communications (GSM), and Fifth Generation (5G), to name a few examples.

In further aspects, the transceiver 114 may transmit and receive signals/information/data to and from the vehicle components, e.g., the sensor unit 112, the vehicle control unit 120, the sound exciter 122, the HMI 124, and/or the like.

The processor 118 may be disposed in communication with one or more memory devices disposed in communication with the respective computing systems (e.g., the memory 116 and/or one or more external databases not shown in FIG. 1). The processor 118 may utilize the memory 116 to store programs in code and/or to store data for performing operations in accordance with the disclosure. The memory 116 may be a non-transitory computer-readable storage medium or memory storing a program code that may enable the processor 118 to perform operations in accordance with the present disclosure. The memory 116 may include any one or a combination of volatile memory elements (e.g., dynamic random-access memory (DRAM), synchronous dynamic random-access memory (SDRAM), etc.) and may include any one or more nonvolatile memory elements (e.g., erasable programmable read-only memory (EPROM), flash memory, electronically erasable programmable read-only memory (EEPROM), programmable read-only memory (PROM), etc.).

During operation, when the user 104 desires to cause and control the vehicle movement via the removable work surface 402, the user 104 may first transmit a request ("user request") to the vehicle 102 to activate a predefined vehicle mode (e.g., a remote vehicle control mode). The user 104 may transmit the user request via a voice command or via an input on the HMI 124. The transceiver 114 may receive the user's voice command or the input and may transmit it to the processor 118.

The processor 118 may obtain the user request for activating the remote vehicle control mode from the transceiver 114. Responsive to obtaining the user request, the processor 118 may check whether the removable work surface 402 is within a predefined distance range (e.g., 15 feet) of the vehicle 102 based on the signals obtained from the wireless tag 504 (that may be included in the removable work surface 402/clipboard 110, as described above). In an exemplary aspect, the processor 118 may determine whether the removable work surface 402 is within the predefined distance range of the vehicle 102 by measuring the Received Signal Strength Indicator (RSSI) value of the signals received by the transceiver 114 from the wireless tag 504. If the measured RSSI value is relatively high, it may indicate that the removable work surface 402 is close or within the predefined distance range of the vehicle 102.

The processor 118 may not activate the remote vehicle control mode and may output an error notification (e.g., via the HMI 124, the sound exciter 122, etc.) when the processor 118 determines that the removable work surface 402 is outside the predefined distance range of the vehicle 102. On the other hand, the processor 118 may activate the remote vehicle control mode when the processor 118 determines that the removable work surface 402 is within the predefined distance range of the vehicle 102.

When the remote vehicle control mode is activated, the user 104 may provide user inputs (e.g., via voice commands) to the vehicle 102 to cause and control the vehicle movement. For example, when the user 104 is outside the vehicle 102 and performing an outdoor activity (as shown in FIG. 1), the user 104 may provide a voice command to the vehicle 102 stating, "Move the vehicle forward by 6 inches", while standing in proximity to the vehicle 102 and carrying the removable work surface 402 in the user's hand.

The processor 118 may obtain (via the transceiver 114) such a user input from the user 104 and then cause the vehicle movement based on the user input. As an example, the processor 118 may transmit a command signal to the vehicle control unit 120 to cause the vehicle movement in the forward direction by 6 inches, when the user input indicates that the user 104 desires the vehicle 102 to move forward by 6 inches.

In an exemplary aspect, before causing the vehicle movement as described above, the processor 118 may confirm whether the user 104 actually desires to move the vehicle 102 according to the voice command. For example, in this case, responsive to obtaining the user input from the user 104, the processor 118 may audibly output the obtained user input via the sound exciter 122. As an example, the processor 118 may output "Are you sure you want to move the vehicle forward by 6 inches?" responsive to obtaining the user input. The user 104 may hear such a notification and may provide a confirmation (e.g., by stating "Yes") to the vehicle 102. The processor 118 may obtain the user confirmation and then cause the vehicle movement according to the user's input, responsive to obtaining the user confirmation. In this manner, the processor 118 adds an additional layer of security by seeking the user's confirmation before causing the vehicle 102 to move.

As another layer of security, before causing the vehicle movement and/or while the vehicle 102 is moving, the processor 118 may continuously obtain inputs from the sensor unit 112 (e.g., RGB images, radar images, etc.) to determine if any obstacle is present on the path of the vehicle movement. Responsive to determining an obstacle presence on the vehicle movement's path based on the inputs obtained from the sensor unit 112, the processor 118 may stop or disable the vehicle movement, thereby preventing any adverse scenario.

As yet another layer of security, the processor 118 may check whether a new user input (e.g., a second user input) is received by the transceiver 114 within a predefined time duration (e.g., 1 minute) of obtaining a previous user input (e.g., a first user input). The processor 118 may deactivate the remote vehicle control mode (and hence may not accept any new user input until the remote vehicle control mode is reactivated by the user 104) responsive to determining that no new user input is received by the transceiver 114 within the predefined time duration of obtaining the previous user input. In this manner, the processor 118 automatically deactivates the remote vehicle control mode if the user 104 does not provide any command to the vehicle 102 for the predefined time duration (e.g., 1 minute), thereby preventing a scenario where the user 104 activates the remote vehicle control mode and then later forgets that this mode is activated (which may result in an adverse situation).

In an exemplary aspect, the processor 118 may additionally obtain an explicit user request (via a voice command or HMI 124) to deactivate the remote vehicle control mode, and the processor 118 may deactivate the remote vehicle control mode responsive to obtaining such a request from the user 104.

In an exemplary aspect, there may be many ways in which the user 104 can cause and control the vehicle movement via the removable work surface 402. For example, in one aspect, the user 104 may make the vehicle 102 follow the user 104 (specifically the removable work surface 402) when the user 104 may be carrying the removable work surface 402 in the user's hand, as shown in FIG. 1. In this case, the processor 118 may determine that the user 104 desires the vehicle 102 to follow the user's/removable work surface's movement based on the obtained user input or voice command. For example, the processor 118 may determine that the user 104 desires the vehicle 102 to follow the removable work surface's movement when the user's voice command states "Follow me".

Responsive to such determination, the processor 118 may determine a real-time location of the removable work surface 402 based on the signals obtained from the wireless tag 504. In an exemplary aspect, in this case, the vehicle 102 may include a plurality of transceivers (similar to the transceiver 114) that may be located at different locations on the vehicle 102, and each transceiver may be configured to receive the signals from the wireless tag 504. The processor 118 may obtain inputs from each of these transceivers and then perform triangulation based on the obtained inputs to determine the real-time location of the removable work surface 402 in proximity to the vehicle 102. In further aspects, the processor 118 may determine the real-time location of the removable work surface 402 based on the images captured by the vehicle's cameras, radar sensors, etc.

Responsive to determining the real-time location of the removable work surface 402, the processor 118 may cause the vehicle movement based on the determined real-time location such that the vehicle 102 follows the movement of the removable work surface 402 (and hence the user 104). In an exemplary aspect, while causing the vehicle movement in this case, the processor 118 ensures that the vehicle 102 maintains the same distance from the removable work surface 402 as the distance that was there when the user 104 provided the command to the vehicle 102 to follow the removable work surface 402.

Figure 6:
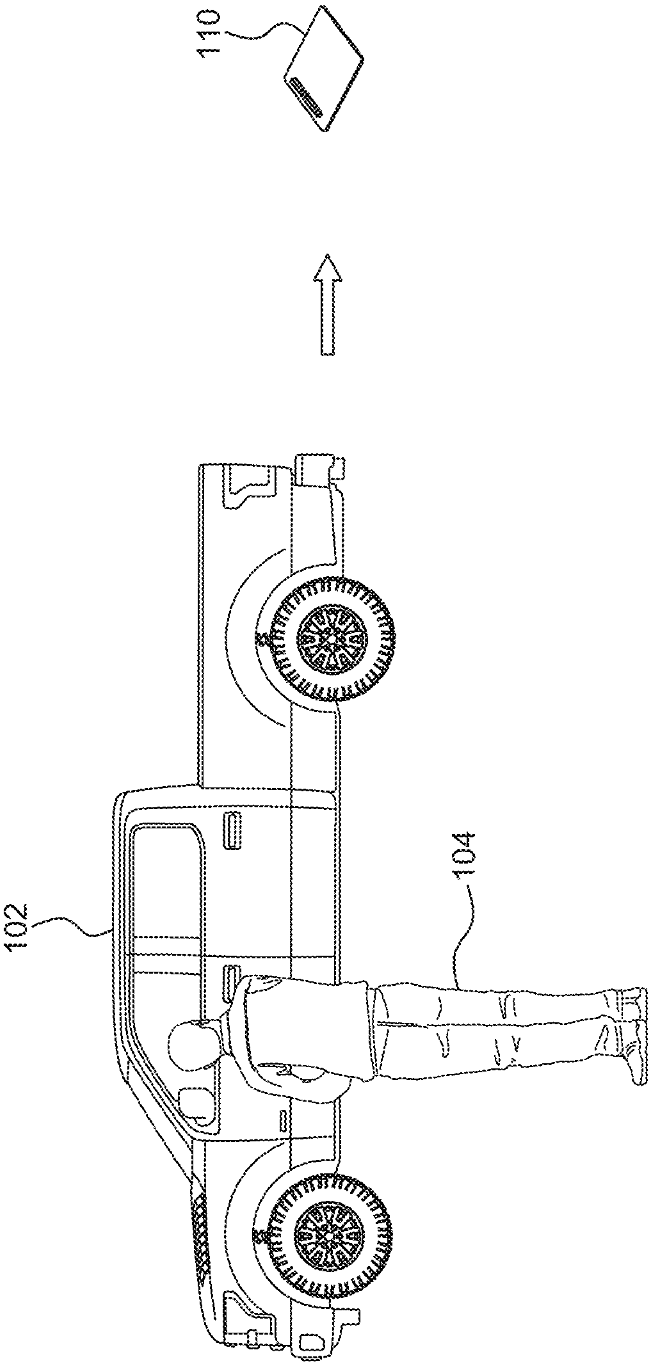
FIG. 6 depicts a view of a vehicle backing to a clipboard in accordance with the present disclosure.

As another example, the user 104 may make the vehicle 102 to back up or reverse and park up to the removable work surface 402, as shown in FIG. 6. In this case, the user 104 may put or keep the removable work surface 402 where the user 104 desires the vehicle 102 to back up and then output a voice command “Back up to the clipboard” or “Back up within 2 feet of the clipboard”. In this exemplary aspect, the processor 118 may determine that the user 104 desires the vehicle 102 to park in proximity to the removable work surface 402 based on the user's voice command or input. Thereafter, the processor 118 may determine the real-time location of the removable work surface 402 based on the signals obtained from the wireless tag 504 or based on the images captured by the vehicle's cameras, radar sensors, etc., as described above. The processor 118 may then cause the vehicle movement and park or back up the vehicle 102 in proximity to the removable work surface 402 based on the determined real-time location.

The vehicle 102 may further enable the user 104 to play games in proximity to the vehicle 102 by using the removable work surface 402. For example, the user 104 may take the removable work surface 402 and hide it in a campground and different players/users may compete to find it. In this case, the processor 118 may determine the real-time location of the removable work surface 402 in the same manner as described above and activate one or more vehicle components based on the real-time location to provide hints to the players about the removable work surface's location. For example, the processor 118 may cause the vehicle's interior and/or exterior lights to flash at different frequencies based on how near a player is to the removable work surface's location to provide hints to the player (e.g., flash at an enhanced frequency when the player is getting closer to the removable work surface's location and reduce the frequency when the player is moving further away). In this case, the processor 118 may determine the player's location by using images captured by the vehicle's exterior cameras and/or based on the location of the user device (e.g., a mobile phone) that the player may be carrying. The processor 118 may additionally provide hints to the players about the removable work surface's location by outputting audible notifications via the sound exciter 122/vehicle's speaker system.

In a similar manner, the user 104 may plan a game of scavenger hunt by choosing different destinations/locations across a geographical area. In this case, the geolocations of the places the user 104 went along with the removable work surface 402 may be marked or stored by the processor 118 in the memory 116, and the processor 118 may provide hints to the players about these geolocations in the similar manner as described above during gameplay.

The vehicle 102 implements and/or performs operations, as described here in the present disclosure, in accordance with the owner manual and safety guidelines. In addition, any action taken by the user 104 based on recommendations or notifications provided by the vehicle 102 should comply with all the rules specific to the location and operation of the vehicle 102 (e.g., Federal, state, country, city, etc.). The recommendations or notifications, as provided by the vehicle 102, should be treated as suggestions and only followed according to any rules specific to the location and operation of the vehicle 102.

Figure 7:
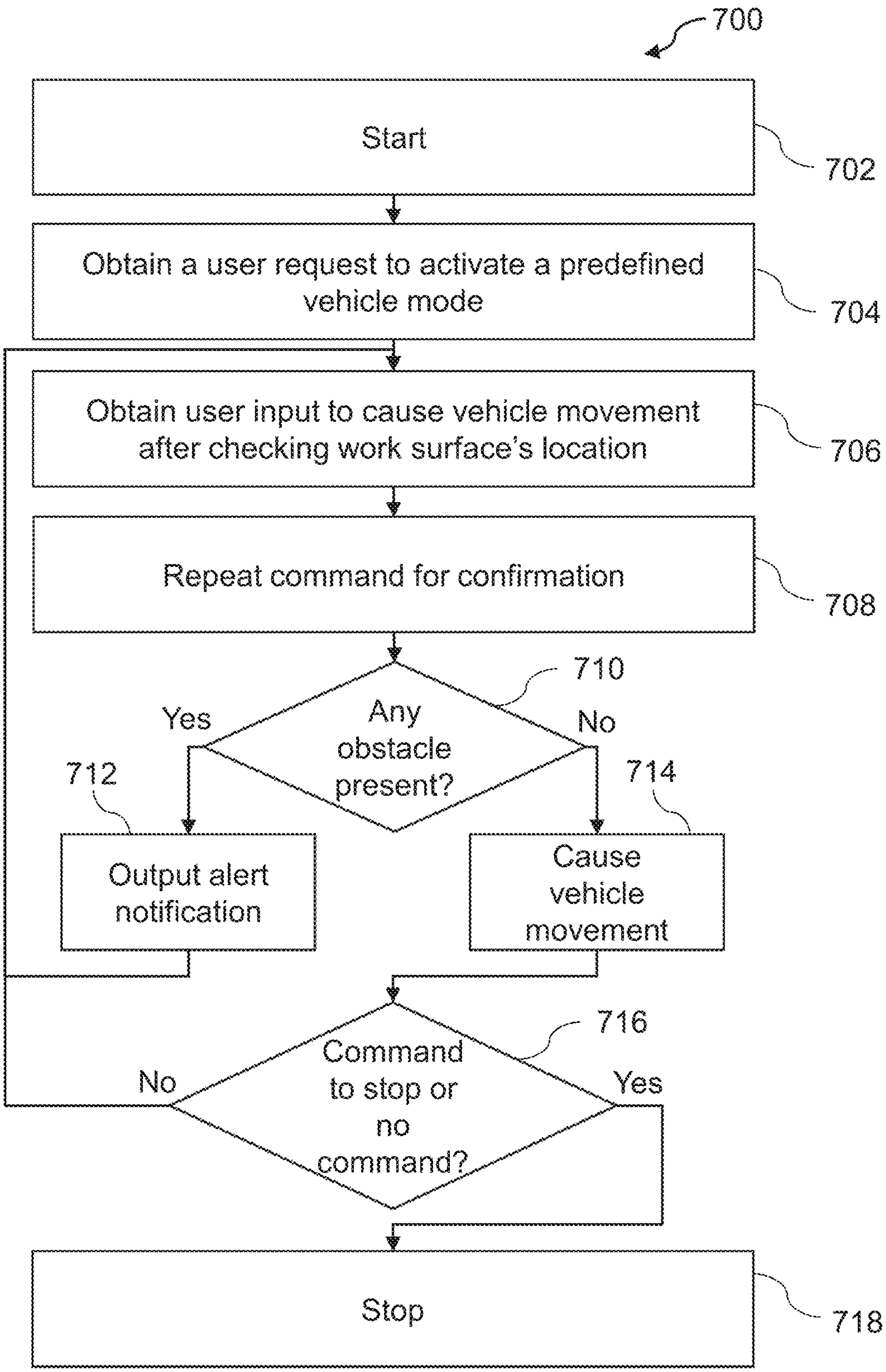
FIG. 7 depicts a flow diagram of a method for enabling vehicle movement via a clipboard in accordance with the present disclosure.

FIG. 7 depicts a flow diagram of a method 700 for enabling vehicle movement via the clipboard 110 in accordance with the present disclosure. FIG. 7 may be described with continued reference to prior figures. The following process is exemplary and not confined to the steps described hereafter. Moreover, alternative embodiments may include more or less steps than are shown or described herein and may include these steps in a different order than the order described in the following example embodiments.

The method 700 starts at step 702. At step 704, the method 700 may include obtaining, by the processor 118, the user request to activate the predefined vehicle mode. Responsive to obtaining the user request, the processor 118 may check whether the removable work surface 402/clipboard 110 is within the predefined distance range of the vehicle 102. As described above, the processor 118 may activate the predefined vehicle mode when the processor 118 determines that the clipboard 110 is within the predefined distance range of the vehicle 102.

At step 706, the method 700 may include obtaining, by the processor 118, the user input to cause the vehicle movement responsive to activating the predefined vehicle mode. At step 708, the method 700 may include repeating, by the processor 118, the user input to seek the user's confirmation. At step 710, the method 700 may include determining, by the processor 118, whether any obstacle is present on the path of the vehicle movement based on the inputs obtained from the sensor unit 112. At step 712, the method 700 may include outputting, by the processor 118, an alert notification when the processor 118 determines at the step 710 that an obstacle is present on the path of the vehicle movement. The method 700 returns to the step 706 after the step 712.

On the other hand, responsive to determining that no obstacle is present on the path at the step 710, the processor 118 may cause the vehicle movement based on the user input at step 714. At step 716, the method 700 may include determining, by the processor 118, whether the user 104 has provided a request to stop/deactivate the predefined vehicle mode or no new user input is received within a predefined time duration of receiving the previous user input. The processor 118 may deactivate the predefined vehicle mode and the method 700 may end at step 718 when the processor 118 determines that the user 104 has provided a request to stop/deactivate the predefined vehicle mode or no new user input is received within the predefined time duration of receiving the previous user input. On the other hand, the method 700 returns to the step 706 after the step 716 when the processor 118 determines that the user 104 has not provided a request to stop/deactivate the predefined vehicle mode and a new user input is received within the predefined time duration of receiving the previous user input.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to “one embodiment,” “an embodiment,” “an example embodiment,” etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A vehicle comprising:

a removable work surface comprising a wireless tag configured to emit signals at a predefined frequency; and a processor configured to:

obtain a user request to activate a predefined vehicle mode;

determine that the removable work surface is within a predefined distance range of the vehicle based on the signals obtained from the wireless tag, responsive to obtaining the user request;

activate the predefined vehicle mode responsive to determining that the removable work surface is within the predefined distance range;

obtain a user input to cause a vehicle movement responsive to activating the predefined vehicle mode; and cause the vehicle movement based on the user input.

2. The vehicle of claim 1 further comprising a vehicle console comprising a console lid, wherein the removable work surface is removably disposed on the console lid.

3. The vehicle of claim 1, wherein the removable work surface comprises a clipboard, and wherein the wireless tag is part of the clipboard.

4. The vehicle of claim 1, wherein the processor obtains the user request via a voice command or a vehicle Human-Machine Interface (HMI).

5. The vehicle of claim 1, wherein the processor is further configured to:

audibly output the user input responsive to obtaining the user input;

obtain a confirmation from a user responsive to audibly outputting the user input; and cause the vehicle movement responsive to obtaining the confirmation.

6. The vehicle of claim 1 further comprising a sensor unit configured to capture inputs associated with vehicle's surroundings, wherein the processor is further configured to:

obtain inputs from the sensor unit;

determine an obstacle presence on a path of the vehicle movement based on the inputs; and disable the vehicle movement responsive to determining the obstacle presence.

7. The vehicle of claim 6, wherein the sensor unit comprises at least one of a Radio Detection And Ranging (radar) sensor, a Light Detection and Ranging (lidar) sensor, or a vehicle camera.

8. The vehicle of claim 1, wherein the processor is further configured to:

obtain a second user request to deactivate the predefined vehicle mode; and deactivate the predefined vehicle mode responsive to obtaining the second user request.

9. The vehicle of claim 1, wherein the processor is further configured to:

determine that a new user input is not obtained within a predefined time duration of obtaining the user input; and deactivate the predefined vehicle mode responsive to determining that the new user input is not obtained within the predefined time duration.

10. The vehicle of claim 1, wherein the processor is further configured to:

determine, based on the user input, that a user desires the vehicle to follow a movement of the removable work surface;

determine a real-time location of the removable work surface based on the signals obtained from the wireless tag, responsive to determining that the user desires the vehicle to follow the movement of the removable work surface; and cause the vehicle movement based on the real-time location of the removable work surface such that the vehicle follows the movement of the removable work surface.

11. The vehicle of claim 1, wherein the processor is further configured to:

determine, based on the user input, that a user desires the vehicle to park in proximity to the removable work surface;

determine a real-time location of the removable work surface based on the signals obtained from the wireless tag, responsive to determining that the user desires the vehicle to park in proximity to the removable work surface; and cause the vehicle movement and park the vehicle in proximity to the removable work surface based on the real-time location of the removable work surface.

12. The vehicle of claim 1, wherein the processor is further configured to:

determine a real-time location of the removable work surface based on the signals obtained from the wireless tag; and activate one or more vehicle components based on the real-time location.

13. The vehicle of claim 12, wherein the one or more vehicle components comprise at least one of an interior light, an exterior light, or a speaker.

14. The vehicle of claim 1, wherein the wireless tag is at least one of a Bluetooth Low Energy (BLE) tag or an Ultra-Wideband (UWB) tag.

15. A method comprising:

obtaining, by a processor, a user request to activate a predefined vehicle mode;

determining, by the processor, that a removable work surface is within a predefined distance range of a vehicle based on signals obtained from a wireless tag responsive to obtaining the user request, wherein the removable work surface comprises the wireless tag configured to emit the signals at a predefined frequency;

activating, by the processor, the predefined vehicle mode responsive to determining that the removable work surface is within the predefined distance range;

obtaining, by the processor, a user input to cause a vehicle movement responsive to activating the predefined vehicle mode; and causing, by the processor, the vehicle movement based on the user input.

16. The method of claim 15 further comprising:

audibly outputting the user input responsive to obtaining the user input;

obtaining a confirmation from a user responsive to audibly outputting the user input; and causing the vehicle movement responsive to obtaining the confirmation.

17. The method of claim 15 further comprising:

obtaining inputs from a sensor unit of the vehicle, wherein the sensor unit is configured to capture the inputs associated with vehicle's surroundings;

determining an obstacle presence on a path of the vehicle movement based on the inputs; and disabling the vehicle movement responsive to determining the obstacle presence.

18. The method of claim 15 further comprising:

obtaining a second user request to deactivate the predefined vehicle mode; and deactivating the predefined vehicle mode responsive to obtaining the second user request.

19. The method of claim 15 further comprising:

determining that a new user input is not obtained within a predefined time duration of obtaining the user input; and deactivating the predefined vehicle mode responsive to determining that the new user input is not obtained within the predefined time duration.

20. A non-transitory computer-readable storage medium having instructions stored thereupon which, when executed by a processor, cause the processor to:

obtain a user request to activate a predefined vehicle mode;

determine that a removable work surface is within a predefined distance range of a vehicle based on signals obtained from a wireless tag responsive to obtaining the user request, wherein the removable work surface comprises the wireless tag configured to emit the signals at a predefined frequency;

activate the predefined vehicle mode responsive to determining that the removable work surface is within the predefined distance range;

obtain a user input to cause a vehicle movement responsive to activating the predefined vehicle mode; and cause the vehicle movement based on the user input.

* * * * *